United States Patent [19]

Fink, Jr.

[11] Patent Number: 4,825,916

[45] Date of Patent: May 2, 1989

[54] FLOW CONTROL VALVE

[75] Inventor: Arthur C. Fink, Jr., Lonedell, Mo.

[73] Assignee: Husky Corporation, Pacific, Mo.

[21] Appl. No.: 155,984

[22] Filed: Feb. 16, 1988

[51] Int. Cl.⁴ .............................................. F16K 17/24
[52] U.S. Cl. .................................... 141/392; 137/504; 239/572
[58] Field of Search ................ 137/504, 517; 239/572; 222/518, 559; 141/98, 392

[56] References Cited

U.S. PATENT DOCUMENTS

| | | | |
|---|---|---|---|
| 2,198,487 | 4/1940 | Sisk | 137/504 |
| 3,015,341 | 1/1962 | Hedland et al. | 137/504 |
| 3,170,481 | 2/1965 | Presnell | 137/504 X |
| 3,319,648 | 5/1967 | Donner | 137/504 |
| 3,339,580 | 9/1967 | Cutler et al. | 137/504 |
| 3,359,998 | 12/1967 | Fike | 137/517 |
| 3,805,824 | 4/1974 | Robbins | 137/504 |
| 4,066,096 | 1/1978 | Lind | 137/504 |

FOREIGN PATENT DOCUMENTS 53-20125  2/1978  Japan .................................. 137/504

Primary Examiner—Stephen Hepperle
Attorney, Agent, or Firm—Paul M. Derk

[57] ABSTRACT

A flow control valve for use in dispensing fuel or other fluid and which can be facilely installed in the inlet end of an automatic fuel dispensing nozzle. This flow control valve does not incorporate a valve seat, for its piston like valve, and pressure compensation is controlled by the valve and includes a sleeve incorporating a slidable piston therein, a fluid outlet port is provided at one end of the sleeve, and which is capable of being partially closed by the slide of the piston therein, under fluid pressure conditions, to thereby create a pressure drop that eventually forces the piston into the sleeve and to close off the sleeve port openings in order to reduce fluid flow, during a dispensing function.

7 Claims, 3 Drawing Sheets

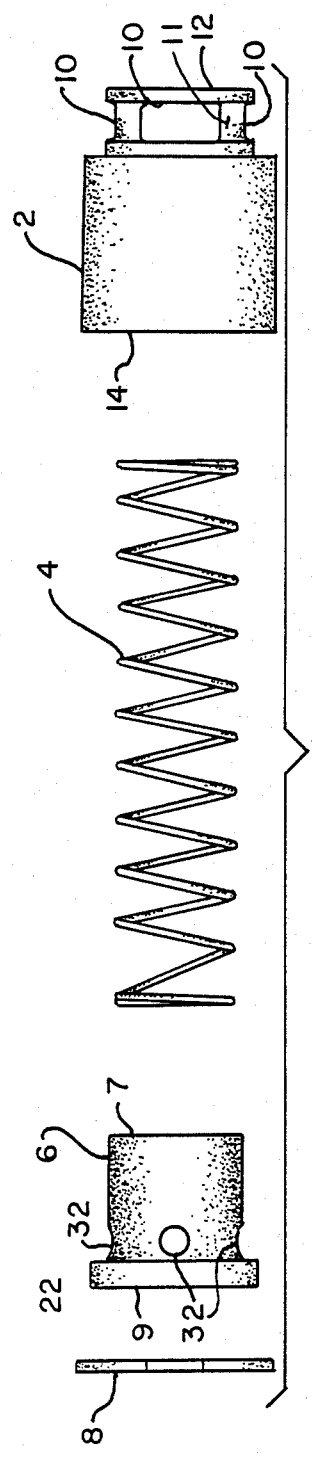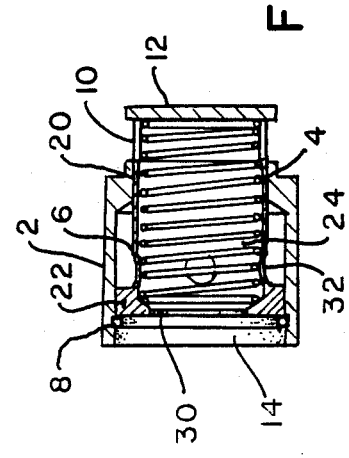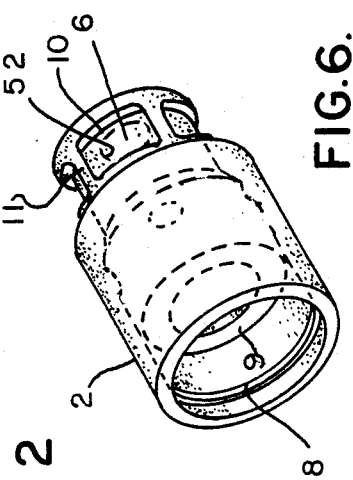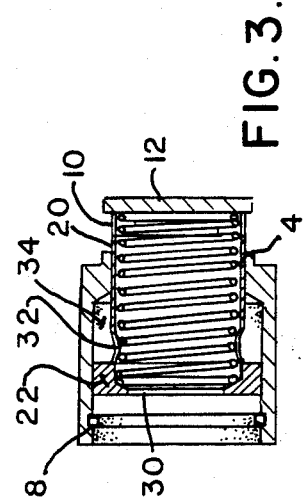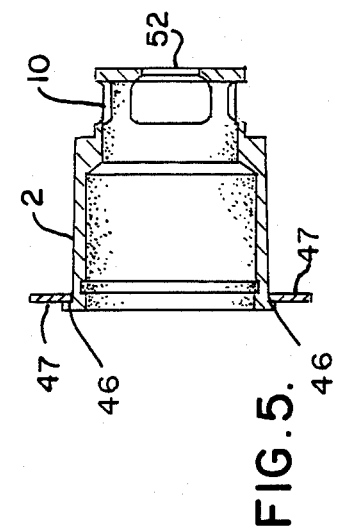

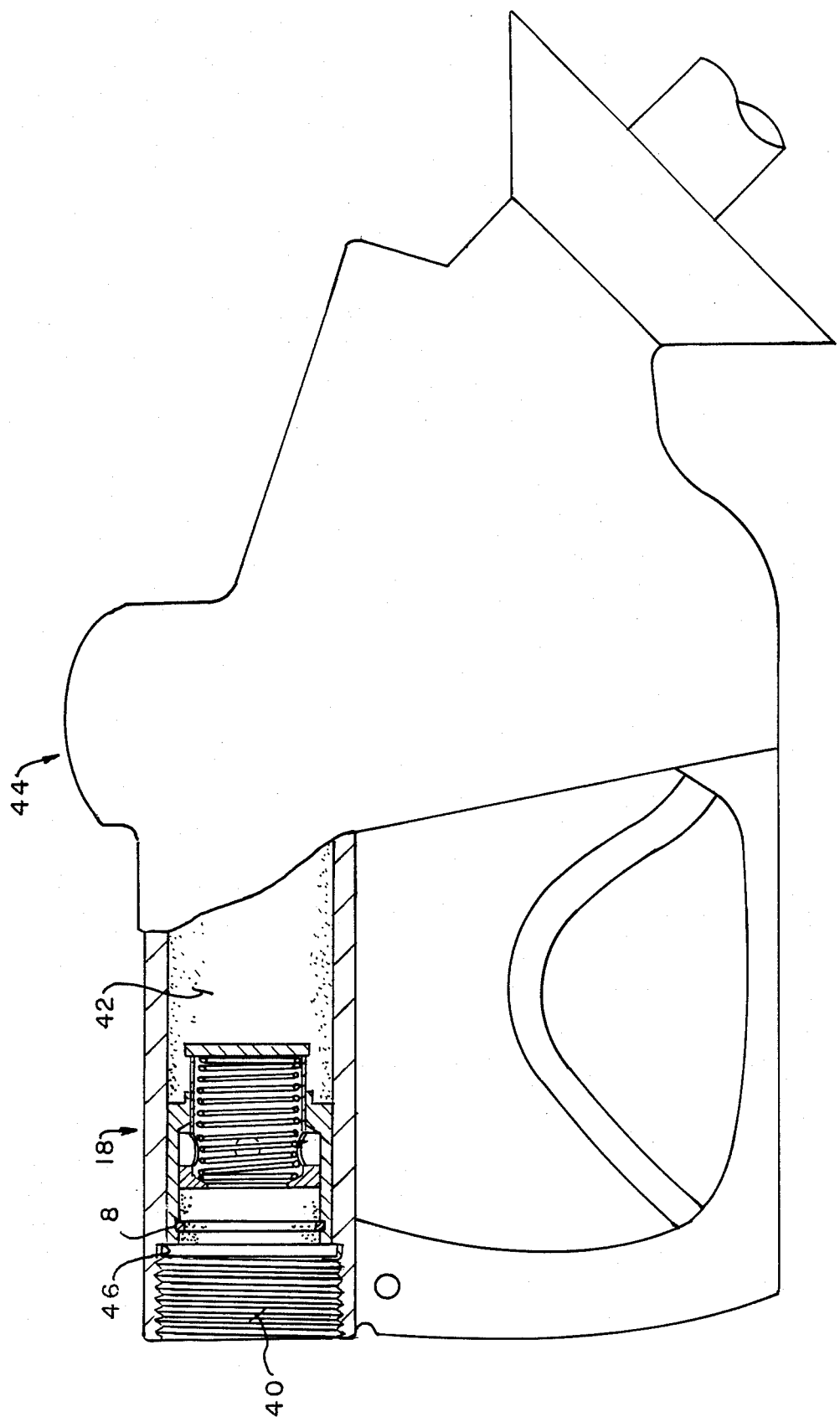

FLOW CONTROL VALVE

BACKGROUND OF THE INVENTION

Fluid flow control valves have been available and in usage for many years, primarily for providing some regulation to the flow of fluids through a flow line. Numerous patents have been issued upon this type of technology, and even recently, as illustrated in the U.S. patents U.S. Pat. No. 4,442,997; U.S. Pat. No. 4,453,700; U.S. Pat. No. 4,541,610; U.S. Pat. No. 4,693,450; and U.S. Pat. No. 4,695,034.

A review of the designs of these earlier flow control valves readily discloses varying degrees of complexity, in their structure and methods of operation, with most of such valves being of rather precision and integrated assembly, making them rather complex instruments of usage. In fact, due to their complex construction, few, if any, known flow control valves could or can be used in a nozzle of a fuel dispensing system, as for use in the routine delivery of gasoline to the customer.

The general construction of flow control valves are usually designed incorporating the principle that some force is exerted upon a valve member thereby urging it into or against a valve seat. Such valve-urging force is normally counteracted by a resilient member, such as spring, or other biasing means, within a valve body. In such flow regulators both the valve and the valve seat are machined to precise tolerances to provide for a close and fluid tight fit.

Through the construction of this current invention, a flow control valve is provided which does not have a valve seat, and a consequence of this quite different approach is that it is much simpler of construction, and lesser expensive to manufacture, than such valves as heretofore have been made.

SUMMARY OF THE INVENTION

This invention contemplates the construction, and method of application, of a pressure compensating control valve, one that is generally and practically applied within the nozzle of a fuel dispensing device. The valve of the current device includes a sleeve and a piston. The sleeve is generally hollow in nature, having a cavity therein, and also includes a partially closed end and an open inlet end, which forms the cavity therein, and which is adapted to receive the piston. A fluid outlet port is provided within the sleeve, adjacent to its closed end, so that the closed end is actually the outlet end of the valve, during functioning. The piston is a complimentary member which is slidably disposed in the sleeve cavity. Its open end is within the sleeve cavity, and its partially enclosed end is disposed away from the partially closed end of the surrounding sleeve. The piston is slidably received within the sleeve, and it it capable of closing the fluid outlet port, during functioning. An inlet orifice is provided in the partially closed end of the piston for fluid flow from outside to inside of the valve chamber, during usage. This orifice constriction creates a pressure drop there across, while fluid flows therethrough, and this pressure then urges the piston into the sleeve cavity and towards the fluid outlet port. When the piston reaches the extent of the fluid outlet port, within the sleeve, it diminishes the size of the port opening, thereby limiting or stopping the flow of fluid through the outlet port. Spring means is provided and biases against the piston and its pressrue drop and resist movement of the piston across the outlet port to determine and regulate the fluid flow rate through the said outlet port. Retaining means prevents the spring from forcing the piston out of its sleeve location.

The concept of this invention, comprising a flow control valve, can be incorporated within the nozzle, itself, as shown in the application drawings, or in the alternative, such a regulator can be provided within a swivel connector, or within a pipe type coupling that incorporates the flow regulator and which coupling can be inserted within a fuel or other fluid flow line, to provide for the enhanced attributes derived from this invention during its application, as reviewed herein.

BRIEF DESCRIPTION OF DRAWINGS

In referring to the drawings,

FIG. 1 is an exploded view of the flow control valve of this invention;

FIG. 2 is a cross sectional view of the valve in its wide open position;

FIG. 3 is a similar cross sectional view of the valve as shown in FIG. 2, but being partially closed;

FIG. 4 discloses, in cross section, the closed valve;

FIG. 5 is a sectional view of the valve sleeve showing additional embodiments of the invention; and FIG. 6 is an isometric view of the valve similar to the view in similar 4, showing the closed valve;

FIG. 7 shows partially in section, a fuel nozzle with the valve of this invention incorporated therein;

DESCRIPTION OF THE PREFERRED EMBODIMENT

Figure 8:
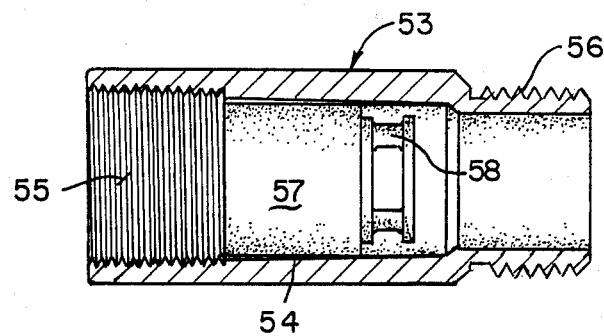
FIG. 8 discloses the flow control valve of this invention as incorporated within a pipe type section or coupling.

This invention is devised around the principle that the provision of a fixed orifice, and a constant pressure drop that is maintained across it by varying the down stream pressure as the upstream pressure varies, that the flow through the valve means will be constant. It can be readily disclosed how the valve of this particular invention utilizes that principle to make it efficient, but a simplified operating valve.

As disclosed in FIG. 1 of the drawings, the flow control valve of this invention consists of only four components, a sleeve 2, a resilient member such as a spring 4, a valve piston 6, and a retaining ring or similar type means 8. It will be noted that the sleeve 2 does not have a valve seat within it, but rather, it is provided with outlet ports 10, between integral arms 11, attaching to the reduced closed end 12. Its larger end 14 is generally opened at that end, forming a cavity within the sleeve to receive the spring 4, and the piston 6, as can be seen and which is illustrated in FIG. 2. The sleeve thus has a closed outlet end 12, and an open inlet end 14. The piston 6, on the other hand, has an open outlet end 7, and a partially closed inlet end 9, as shown.

The assembled flow control valve 18, is shown in FIG. 2, and it will be noted that its end 20 near the outlet end of the piston 6 is slidable in the reduced outlet end 12 of said sleeve 2. As can be seen, the sleeve 2 has a smaller outlet port end 12 and a larger end opening inlet end 14, as previously illustrated. Likewise, for stability, the piston 6 is provided with a shoulder 22 which is slidably accommodated within the larger sleeve end 14 of the sleeve 2. The piston body at its open end 7 is sized to be slidably inserted within the smaller piston outlet sleeve end of the sleeve 2. When the piston is inserted within the cavity of the sleeve 2, with its open outlet end 7 facing the sleeve partially closed end 12, a valve chamber 24 is formed therein. As shown in FIG. 2, the spring 4 is disposed within this chamber, and the retaining ring, or snap or push ring 8 is provided for locking of the piston and its spring 4 within the sleeve 2, and to engage these various components together into assembly.

Having structurally analyzed the fluid control valve of this invention, its operation and function can now be more clearly described. The elements shown in the drawings, and thus far not previously discussed, will be included within this review of the functional aspects of this valve.

The operations of the flow control valve 18 of this invention is also illustrated in FIGS. 2 through 4. In these figures, particular attention should be directed to the orifice 30, provided through the end 9 of the piston. This orifice is the essence to the valve's operation. The second important elements are the ports 10, as formed within the fixed reduced end of the sleeve 2. As indicated hereinbefore, this valve has no valve seat provided within it. Rather, the piston 6 closes the ports 10 within the sleeve 2 during the limits of its functioning. The fluid flow can be analyzed upon reviewing FIG. 2, and the fluid flows in the valve through the orifice 30, and then through the valve chamber 24, and out the four outlet ports 10, provided around perimeter of the reduced end of the sleeve 2. FIG. 2 discloses the valve with the flow ports 10 being wide open, that is, unobstructed or closed by the piston 6. As the pressure at the inlet to the orifice increases due to heavy flow, a pressure drop across the orifice 30 occurs. When this pressure difference between the inlet side and the outlet side of the orifice is great enough, it will cause the piston 6 to move further into the sleeve 2, towards the ports 10. When the pressure is not sufficient to urge the piston 6 against the closed end 12, it will only partially block the ports 10. This partial obstruction decreases the size of the ports 10, generally as shown in FIG. 3. The smaller ports, then, or the reduced size ports 10, restrict the flow of fluid through them. It will be appreciated that the outlet flow does not increase as the inlet flow increases. If the pressure at the inlet to the orifice is too high, it will force the piston 2 against the closed end 12, fully closing the ports 10, by way of the sleeve 6, as can be seen in FIG. 4. Also, FIG. 6 shows the piston 6 fully closing the ports 10. The closing of the ports 10 causes the pressure in the valve chamber 24, on the downstream side of the orifice 30 to increase. When the pressure difference across the orifice, that is, between the inlet and outlet sides of the orifice, balances the force of the spring 4, the piston 6 moves away from the closed end 12, partially or totally unblocking the ports 10 (See FIGS. 2 or 3), so that the fluid flow once again proceeds. By adjusting the size of the orifice 30, and the force of the spring 4, the maximum flow rate can be predetermined, and properly regulated.

The purpose of the shoulder 22 must be reviewed. By virtue of the construction of this shoulder 22, integrally within the fabrication of the sleeve 6, the pocket 34 is formed. This pocket or varying sized cavity is partially formed integrally around the piston 6, near its inlet end, as can be noted. There are fluid ports 32 provided within the piston, at this location, and as the piston is urged into the sleeve, as under heavy fluid flow, this relieves any tendency to form a vacuum as the spring 4 returns the piston 6 to its normally opened port position, as shown in FIG. 2. Thus, the purpose of the holes 32 are to keep a balance in the pressure between the pocket 34 and the inside of the piston 6. If there were no holes or fluid ports 32 provided through the piston 6, then the piston normally could not move because there would be no place for the fluid within the pocket 34 to move, and thus would become pressurized, and prohibit or retard the free movement of said piston.

One of the advantages of this invention is the provision of a pressure compensated flow control valve which can be easily installed in a fuel dispensing system. There are various reasons for using a flow regulator of this type, when dispensing fuel into a motor vehicle. Some vehicles do not accept at higher rates of flow. And, vapor recovery systems are designed to function under specific maximum flow rates. The on board vapor retention systems will also not handle high rates of flow of gasoline into the vehicle fuel tank. In addition, the piston head 6 at its orifices, such as the orifice 30 provided therethrough, in addition to the ports 10, in combination with the spring 4, all function in combination to form a flow measuring type device. The pressure difference, as a result of the higher pressure developing upstream of the orifice 30, then the lower pressure that remains downstream from the said orifice, causes the piston head 6 to move against the spring in dependency upon the rate of flow of the fluid therethrough. There is a need in the industry for a device of this type that can regulate maximum flow to a predetermined rate, have little resistance to flows at less than the maximum rate, and fit into a highly confined space such as that of a nozzle or swivel, as shown in this application. To accomplish this, a series of step down diameters are employed within the regulator, with the outside diameter of the piston being reduced in diameter to allow the maximum diameter and area for the orifice and piston and the small diameter valve end to allow room for flow through these regulator parts, and function as valve, that has pressure differences generated at its upstream side, within it, and its downstream side, for regulating flow, and for functioning also as a flow measuring device. Thus, by regulating the size of the orifices within this valve, flow measurements can be better determined, and flow regulation, can be more effectively achieved.

As shown in FIG. 7, unlike most valves which are either too large or are not cylindrical of design, the valve of this invention can be readily inserted within the inlet end of the automatic dispensing fuel nozzle, just inwardly where the hose threadily engages therein. The nozzle threads 40 are larger than the inside 42 of the nozzle 44. This leaves a shoulder as can be seen in said FIG. 7.

The valve 18, as shown therein, in turn may be provided with a flange 46, as can also be seen in FIG. 5. When inserted within the inlet nozzle 44, this flange 46 rests upon this formed ledge. Additional flange means 47 may also be employed to provide seating of the valve within the nozzle, if needed. The valve is then held in position by means of the threaded engagement of the hose therein, the hose not being shown, which is screwed into position upon the integral threads 40 of the shown nozzle. The flow control valve is pressure compensated so that a pumping station with low pressure capabilities will not be hampered by a fixed restriction designed to limit the maximum flow on the highest pressure system that may be encountered in the field. In addition, although the flow ports 10 can be completely closed, as for example, by seals within the sleeve and on the inside of the closed sleeve end 12, it is not necessary for the valve to have a leak-type fit around the ports since there is a limit to the maximum pressure that is encountered in fuel dispensing systems.

In light of the teachings of this invention, various modifications to this device may occur to those skilled in the art upon reviewing the same. Thus, even though a cylindrical valve is shown as the preferred embodiment, a sleeve and piston of other shapes, such as one that is formed polyhedral, may be utilized. Square of hexagonal cross-sectional sleeves are just as suitable as a circular cross section type sleeve, so long as the piston is similarly shaped and readily slidable therein, to function in the manner as described herein. In addition, with such a slidable fit, the pocket 34 can be dispensed with, and the cross sections of the sleeve and piston can be uniform throughout. Additional embodiments of this invention are illustrated in FIG. 5. The flanges 46 and 47 are shown in that particular figure. It will be appreciated that these flanges can be integral with the sleeve 2, or separate therefrom, while the flange 47 is shown being held in place by means of the flange 46. Moreover, the valve need not be to the shape of the nozzle interior so long as the flange fits closely inside the nozzle. By changing the shape of the flange the valve can be made to fit within a variety of designed dispensing nozzles.

As can be seen in FIG. 8, a pipe coupling or section, as shown at 53, may also be employed, and incorporate the structure of this valve, as shown at 54. The pipe coupling may include a threaded end, as at intake end 55, and to which a hose, or other pipe section, may be engaged. The opposite end of the coupling likewise may include an externally threaded end, as at 56, to which a hose or other means may be coupled, or simply may incorporate the pressure fit of a hose or other conduit means thereon. The regulator valve of this invention, as shown at 54, includes its sleeve like part 57, having its integral arms, as at 58, formed therewith, and having the valve piston (not shown) incorporated internally thereof, in the manner as previously explained and described in this application.

Figure 9:
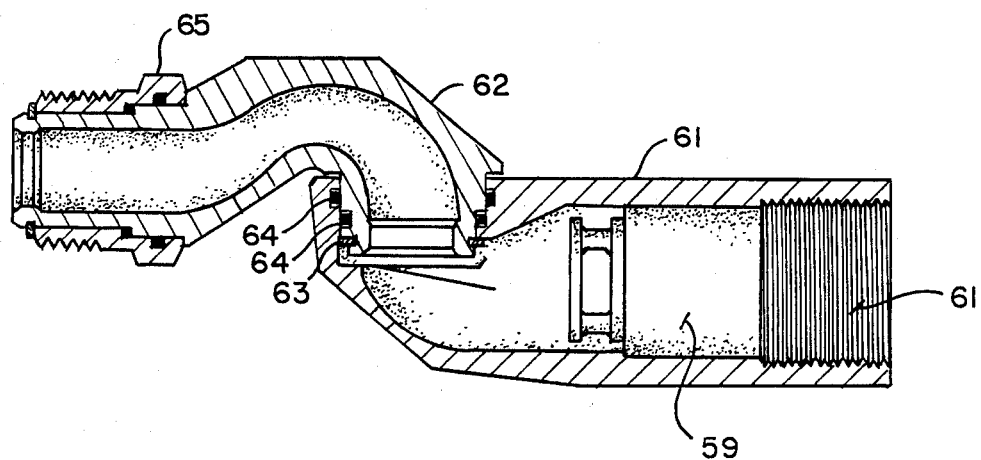
FIG. 9 discloses the incorporation of the flow control regulator of this invention provided within a swivel connector, of the type as utilized within the fuel dispensing art.

Furthermore, the control valve of this invention, as shown in FIG. 9, as at 59, may be incorporated within a swivel connector, of the type as shown therein, and which may be used in conjunction with a fuel line dispenser, of the type where the hose may threadily engage within the threaded end, as at 60, of the connector. In addition, this swivel connector may include a fixed portion, as at 61, having the swivel portion, as at 62, connected therewith, through a series of connectors, as at 63, and sealing O-rings, as at 64, with a swivel type nut, as at 65, provided at its other end, for connection with the fuel dispensing nozzle, or related type of instrument. As provided therein, the flow control valve functions as a fuel measuring or flow control means for regulating the flow of fuel, or other fluid, through the swivel connector, and to its dispenser. These are just examples of other applications for the flow control valve of this invention, as incorporated within the type of structure that may be currently used in the fuel and other fluid dispensing arts.

In another embodiment of this invention, an aperture 52 can be provided in the normally closed end of the sleeve, to further reduce flow restriction when the pressure is low, since there is a limit on the maximum pressure that may be available during fuel dispensing. Finally, the valve can be inserted in other parts of fuel dispensing systems, function just as effectively, such as within the swivel connectors that normally connect with a fuel dispensing nozzle, within the flow lines, the pipes, or within the dispenser, and the like. Since these and other ramifications or modifications in the structure and usage of this invention are obvious, after review of the disclosure herein, they are deemed to be within the spirit of this invention, and are intended to be encompassed within the scope of any claims to patent protection issuing upon this development.

Having thus described the invention what is claimed and desired to be secured by letters patent is:

1. In combination with a hand held fuel nozzle of a fuel dispensing system, a wholly contained pressure compensating control valve for use in the flow of fuel comprising a hollow sleeve having a partially closed end and a fully opened inlet end forming a cavity therein adapted to receive a piston, a fluid outlet port in the sleeve adjacent to the partially closed end so that the end is the sleeve's outlet end, a complimentary fittig piston completely disposed within the sleeve cavity and having a fully opened end provided within sleeve cavity and a partially closed end away from the sleeve partially closed end, thereby forming a valve chamber between the two partially closed ends, the piston being slidably located within the sleeve and capable of closing the fluid outlet port provided within the sleeve, an inlet orifice in the partially closed end of the piston for providing a restriction for fuel flow from outside to inside of the formed valve chamber, the orifice restriction creating a pressure drop there across urging the piston further into the sleeve cavity to eventually cover the fluid outlet port, thereby diminishing the size of the port opening and limiting the flow of fuel through the said outlet port, spring means biasing against the piston and resisting its movement across the outlet port of the sleeve to determine and regulate the fuel flow rate through the said outlet port, retaining means preventing the spring means from forcing the piston out of its location within the said sleeve, said sleeve and piston being cylindrical in design, a fuel pocket being formed to retain fuel when the piston is urged into the valve chamber, said pocket formed around the piston and within the sleeve cavity, at least one aperture provided through the piston and leading from within the piston into the formed pocket and provided to conduct fuel thereto, thereby partially compensating for any pressure drop generated within the sleeve and relieving any tendency of a vacuum to form on return of the piston to its normally opened position.

2. The invention of claim 1 and wherein the retaining means is a push ring.

3. The invention of claim 1 and wherein the sleeve includes a flange means permitting the valve to be held within the inlet end of the fuel dispensing nozzle opening.

4. The invention of claim 1 and wherein the partially enclosed end of the sleeve is provided with an aperture for reducing the pressure across the valve under low pressure conditions.

5. The invention of claim 1 and wherein the control valve of said invention is installed within the nozzle of a fuel dispensing system.

6. The invention of claim 1 and further including swivel connector, and said control valve being located within said swivel connector and functioning as a pressure compensating control valve.

7. The invention of claim 1 and further including a pipe coupling, and said valve being located within said pipe coupling and functioning as a pressure compensating control valve.

* * * * *